(No Model.)
T. A. EDISON.
INCANDESCENT ELECTRIC LAMP.
No. 264,656. Patented Sept. 19, 1882.
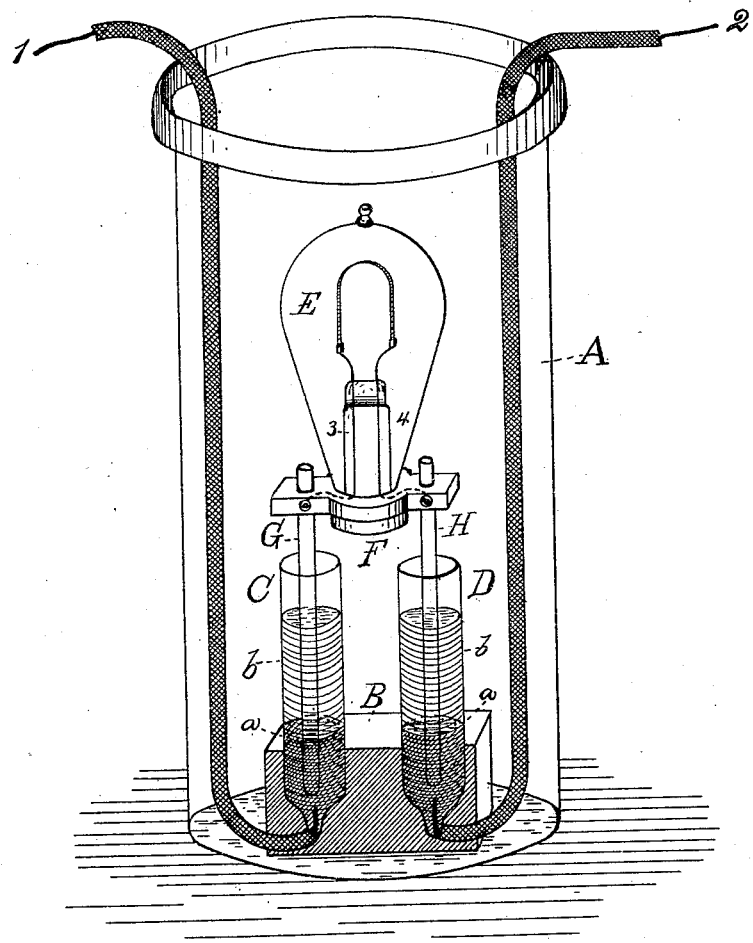
WITNESSES:
E. C. Rowlands
H. W. Seely
INVENTOR:
Thomas A. Edison,
By Rich'd N. Dyer,
Atty.

UNITED STATES PATENT OFFICE.

THOMAS A. EDISON, OF MENLO PARK, NEW JERSEY.

INCANDESCENT ELECTRIC LAMP.

SPECIFICATION forming part of Letters Patent No. 264,656, dated September 19, 1882.

Application filed August 14, 1882. (No model.)

*To all whom it may concern:*

Be it known that I, THOMAS A. EDISON, of Menlo Park, in the county of Middlesex and State of New Jersey, have invented a new and useful Improvement in Incandescent Electric Lamps, (Case No. 459;) and I do hereby declare that the following is a full and exact description of the same, reference being had to the accompanying drawing, and to the letters of reference marked thereon.

The object of this invention is to produce means for making and breaking the connections of incandescing electric lamps, so as to prevent the ignition of inflammable gases, in order that such lamps may be used with safety in mines and similar places. This is accomplished by the use of two upright tubes containing water, into which rods from the lamp are plunged, preventing escape across between the connections, as is the case when a water-jar common to both connections is used. In the bottom of each tube mercury is placed, and the rods from the lamp dip into the mercury, so that there is no decomposition of the water. The lower ends of these tubes are sealed upon wires, preferably of platinum, from which extend insulated circuit-wires. The block supporting the tubes containing mercury and water and the lamp are preferably inclosed in a glass jar for protection. All the connections are made solid and permanent, except those between the rods from the lamp and the mercury, which latter connections being broken under water by raising the lamp there is no danger of igniting inflammable gases. The lamp may be arranged for breaking one connection only, mercury and water being used, as with the two separable connections.

The foregoing will be better understood from the drawing, which is a perspective view of the lamp and connections, the supporting-block being in vertical section.

A is a glass inclosing-jar, in the bottom of which is placed supporting-block B, of wood or other suitable insulating material. This block supports two upright glass tubes, C D, which have open upper ends, but are sealed at their lower ends upon wires, as shown, preferably of platinum. From these sealed wires extend the insulated circuit-wires 1 2. The tubes C D are partly filled with mercury, $a$, and above the mercury they are filled with water, $b$.

E is an incandescing electric lamp, supported upon a base, F, preferably of insulating material, from which base extend downwardly two metal rods, G H, connected with the leading-in wires 3 4 of the lamp. The rods G H are plunged into the water $b$, and are immersed at their ends in the mercury $a$, completing the circuit through the lamp. There is no escape across between the connections, as is the case, to a small extent, when the connections are made in the water of a jar common to both connections, and the water is not decomposed. To break the connections, the lamp is raised; but there is no danger of igniting inflammable gases, since the connections are made and broken under water. It is evident that the device could be constructed so that one connection only would be separable, the connection being made with mercury, above which would be a superimposed body of water.

What I claim is—

1. The combination, with the electrodes of an incandescing electric lamp, of two water-tubes having connections whereby the two connections with the lamps are separately made and broken under water, substantially as set forth.

2. The combination, with an electric lamp provided with a base from which extend metal rods connected with the leading-in wires of the lamp, of tubes containing mercury and water, and circuit-wires running from the mercury of the tubes, substantially as set forth.

This specification signed and witnessed this 7th day of July, 1882.

THOMAS A. EDISON.

Witnesses:
 RICHD. N. DYER,
 EDWARD H. PYATT.